(12) United States Patent
Nakamatsu et al.

(10) Patent No.: US 7,223,339 B2
(45) Date of Patent: May 29, 2007

(54) HOLLOW-FIBER MEMBRANE MODULE

(75) Inventors: Osamu Nakamatsu, Ritto (JP); Hiroshi Ohtani, Otsu (JP); Ichirou Kumo, Shiga (JP)

(73) Assignee: Toray Industries, Inc. (JP)

( * ) Notice: Subject to any disclaimer, the term of this patent is extended or adjusted under 35 U.S.C. 154(b) by 136 days.

(21) Appl. No.: 10/682,186

(22) Filed: Oct. 9, 2003

(65) Prior Publication Data
US 2004/0074833 A1    Apr. 22, 2004

(30) Foreign Application Priority Data
Oct. 16, 2002  (JP) .............. 2002-301530

(51) Int. Cl.
*B01D 63/02* (2006.01)
(52) U.S. Cl. .............. 210/321.81; 210/321.9; 210/500.23
(58) Field of Classification Search .......... 210/198.1, 210/209, 321.81, 321.9, 500.23
See application file for complete search history.

(56) References Cited

U.S. PATENT DOCUMENTS 4,425,234 A * 1/1984 Reitz .................... 210/321.8

2002/0108906 A1 * 8/2002 Husain et al. ............ 210/636

FOREIGN PATENT DOCUMENTS

JP        63004809 A  *  1/1988

* cited by examiner

*Primary Examiner*—John Kim
(74) *Attorney, Agent, or Firm*—DLA Piper US LLP

(57) ABSTRACT

This invention provides an inexpensive hollow-fiber membrane module that can prevent diaphragms from peeling or coming off from the cylindrical casing. The invention includes a hollow-fiber membrane module, comprising a cylindrical casing having an inlet port for the treating liquid at one end and an outlet port for the treating liquid at the other end, a hollow-fiber membrane bundle contained in the cylindrical casing, potting layers for fixing the hollow-fiber membrane bundle to the inner wall of the cylindrical casing at both the ends of the hollow-fiber membrane bundle, a header having an outlet port for the liquid undergoing treatment provided at one end of the cylindrical casing, and a header having an inlet port for the liquid undergoing treatment provided at the other end of the cylindrical casing, wherein baffle cylinders having slits extending in the direction at an angle to the axis of the cylindrical casing are fitted in the potting layers.

8 Claims, 3 Drawing Sheets

HOLLOW-FIBER MEMBRANE MODULE

BACKGROUND

1. Field of the Invention

This invention relates to a hollow-fiber membrane module for treating a liquid using hollow-fiber membranes. More particularly, this invention relates to a hollow-fiber membrane module used for dialysis of blood or used for purification of water such as sewage or wastewater.

2. Description of Related Art

As is well known, for example for dialysis of blood, a hollow-fiber membrane module composed of hollow-fiber membranes (semipermeable membranes) is used. Such a hollow-fiber membrane module comprises a cylindrical casing having an inlet port for the treating liquid at one end and an outlet port for the treating liquid at the other end, a hollow-fiber membrane bundle contained in the cylindrical casing, and potting layers for fixing the hollow-fiber membrane bundle to the inner wall of the cylindrical casing at both the ends of the hollow-fiber membrane bundle, to ensure that a dialyzing fluid can be made to flow in the cylindrical casing from the inlet port toward the outlet port, while blood can be made to flow in the hollow-fiber membranes from the outlet port side toward the inlet port side, for dialysis of blood (see JP7-37700Y).

The above-mentioned hollow-fiber membrane module is obtained by inserting a hollow-fiber membrane bundle slightly longer than a cylindrical casing, into the cylindrical casing made of a plastic material such as polypropylene, polyethylene, polyethylene tetrafluoride, polyester, polycarbonate, or ABS (acrylonitrile-butadiene-styrene), potting the inserted hollow-fiber membrane bundle at its both ends with a polymeric material such as polyurethane or silicone for fixing it at both the ends, cutting off the potting ends using a sharp knife, to open the hollow-fiber membranes at the potting end faces, and installing headers to surround the openings of the cylindrical casing entirely. In this hollow-fiber membrane module, the potting portions function as potting layers. When a potting end is cut off, a force for separating the potting end from the cylindrical casing acts, and in the case where the cylindrical casing is made of a slightly adhesive plastic material such as polypropylene, polyethylene or polyethylene tetrafluoride, it can happen that the potting layer peels or comes off from the cylindrical casing.

It is also proposed to install cylindrical hollow-fiber membrane bundle holders separate from the cylindrical casing at both the ends of the hollow-fiber membrane bundle, in such a manner that the hollow-fiber membrane bundle holders can be bonded to the inner wall of the cylindrical casing. However, since the holders merely support the hollow-fiber membrane bundle without disturbing them, they do not work sufficiently for preventing the potting layers from peeling or coming off. If a potting layer should peel from the cylindrical casing, even though it does not come off, for example in the event of dialyzing blood, the dialyzing fluid and blood are mixed, and normal dialysis cannot be made. Such a membrane module must be thrown away. Furthermore, since it is necessary to manufacture the hollow-fiber membrane bundle holders separately from the cylindrical casing and to install them in the casing beforehand, the increase in the number of parts and the increase in the assembling man-hours raise the production cost of the hollow-fiber membrane module.

SUMMARY OF THE INVENTION

The invention provides an inexpensive hollow-fiber membrane module that prevents the potting layers from peeling or coming off from the cylindrical casing when the potting ends are cut off.

This invention is a hollow-fiber membrane module comprising a cylindrical casing, a hollow-fiber membrane bundle contained in the cylindrical casing, and potting layers for fixing the hollow-fiber membrane bundle to the inner wall of the cylindrical casing at both the ends of the hollow-fiber membrane bundle, wherein baffle cylinders having slits extending in the direction at an angle to the axis of the cylindrical casing are fitted in the diaphragms.

More particularly, one preferred embodiment of the hollow-fiber membrane module of this invention is a hollow-fiber membrane module, comprising a cylindrical casing having an inlet port for the treating liquid at one end and an outlet port for the treating liquid at the other end, a hollow-fiber membrane bundle contained in the cylindrical casing, potting layers for fixing the hollow-fiber membrane bundle to the inner wall of the cylindrical casing at both the ends of the hollow-fiber membrane bundle, a header having an output port for the liquid undergoing treatment provided at one end of the cylindrical casing, and a header having an inlet port for the liquid undergoing treatment provided at the other end of the cylindrical casing, wherein baffle cylinders having slits extending in the direction at an angle to the axis of the cylindrical casing are fitted in the potting layers.

In this case, it is possible that the outlet port for the liquid undergoing treatment provided in the header at one end of the cylindrical casing is used as the inlet port for the liquid undergoing treatment, while the inlet port for the liquid undergoing treatment provided in the header at the other end is used as the outlet port for the liquid undergoing treatment.

Another preferred embodiment of the hollow-fiber membrane module of this invention is a hollow-fiber membrane module, comprising a cylindrical casing having an input port for the liquid undergoing treatment at one end and an outlet port for the liquid undergoing treatment at the other end, a hollow-fiber membrane bundle contained in the cylindrical casing, potting layers for fixing the hollow-fiber membrane bundle to the inner wall of the cylindrical casing at both the ends of the hollow-fiber membrane module, a header having an outlet port for the treating liquid provided at one end of the cylindrical casing, and a header having an inlet port for the treating liquid provided at the other end of the cylindrical casing, wherein baffle cylinders having slits extending in the direction at an angle to the axis of the cylindrical casing are fitted in the potting layers. In this case, it is possible that the outlet port for the treating liquid provided in the header at one end of the cylindrical casing is used as the inlet port for the treating liquid, while the inlet port for the treating liquid provided in the header at the other end is used as the outlet port for the treating liquid.

In the above-mentioned hollow-fiber membrane module, the slits of the baffle cylinders can form portions of spirals extending from a cylindrical screw shaft used as the cylindrical casing. Furthermore, plural slits can also be arranged in the circumferential direction of the baffle cylinders, and in this case, the intervals of the slits can also be equal.

DETAILED DESCRIPTION

Figure 1:
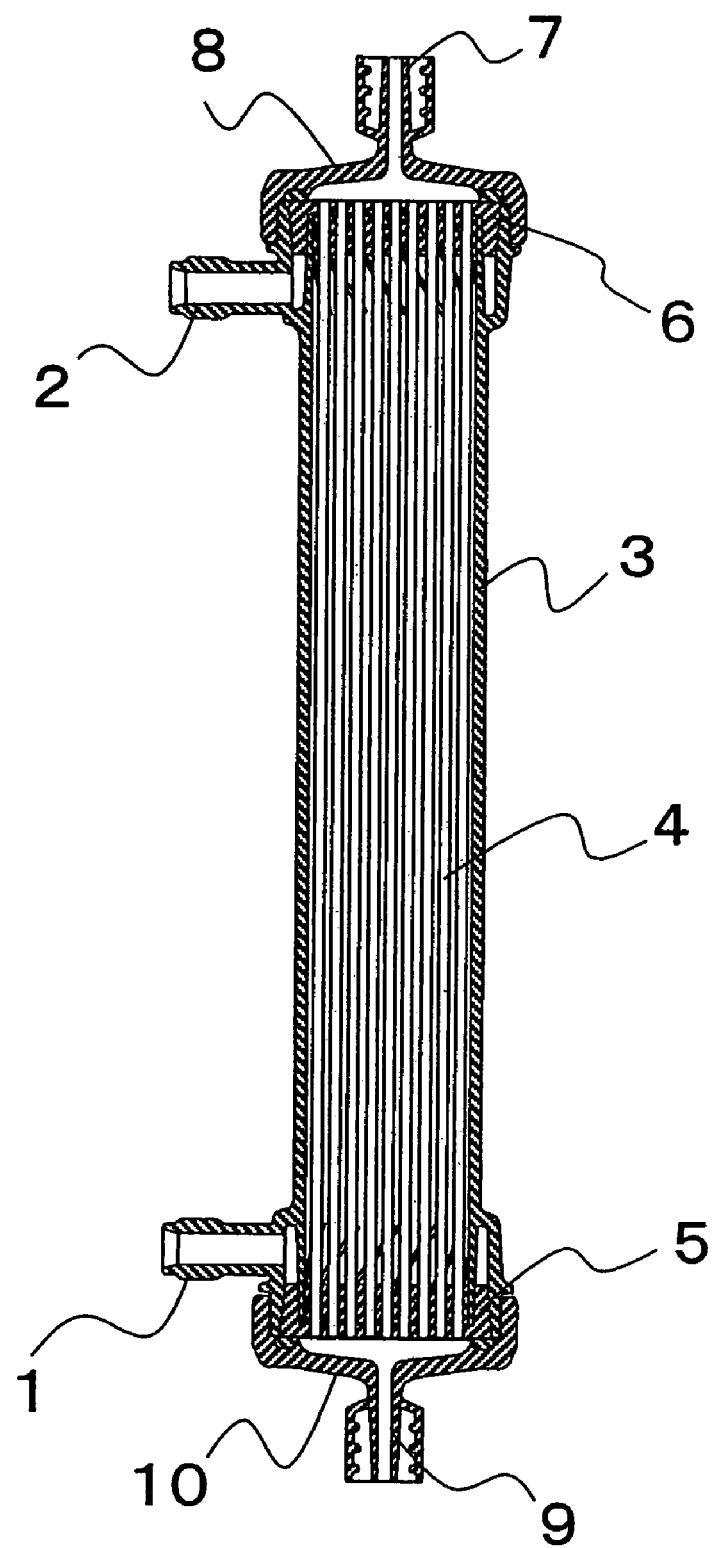
FIG. 1 shows a hollow-fiber membrane module as an embodiment of this invention, and is a schematic vertical sectional view showing a hollow-fiber membrane module used for dialysis of blood.

It will be appreciated that the following description is intended to refer to specific embodiments of the invention selected for illustration in the drawings and is not intended to define or limit the invention, other than in the appended claims.

FIG. 1 shows a hollow-fiber membrane module of this invention used for dialysis of blood. In FIG. 1, the hollow-fiber membrane module comprises a cylindrical casing 3 preferably made of a plastic material such as polypropylene, polyethylene, polyethylene tetrafluoride or the like, having an inlet port 1 for the treating liquid at one end and an outlet port 2 for the treating liquid at the other end, a hollow-fiber membrane bundle 4 having numerous hollow-fiber membranes (semipermeable membranes) substantially parallel to one another in one direction (the axial direction of the cylindrical casing 3), contained in the cylindrical casing 3, and potting layers 5 and 6 for fixing the hollow-fiber membrane bundle 4 to the inner wall of the cylindrical casing 3 at both the ends of the hollow-fiber membrane bundle, obtained by potting the hollow-fiber membranes at their respective ends into a polymeric material such as polyurethane, silicone, epoxy (two-pack mix curable polymeric adhesive) or the like. Furthermore, in FIG. 1, at one end of the cylindrical casing 3, a header 8 having an inlet port 7 for blood as the liquid undergoing treatment is fitted, and at the other end, a header 10 having an outlet port 9 for blood is fitted. The headers 8 and 10 can also be made of the same material as that of the cylindrical casing 3.

Figure 2:
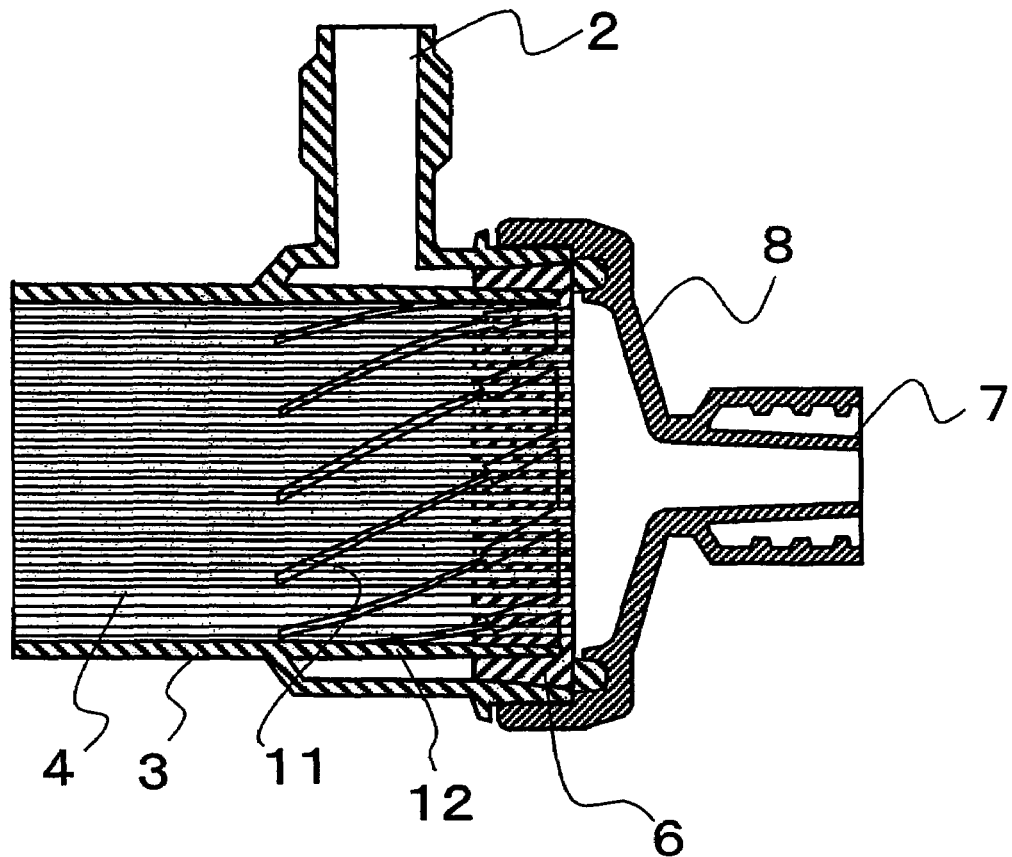
FIG. 2 is a schematic partial longitudinal sectional view showing the end on the treating liquid outlet port side of the hollow-fiber membrane module shown in FIG. 1.

FIG. 2 shows the end on the treating liquid outlet port 2 side of the hollow-fiber membrane module shown in FIG. 1. In FIG. 2, the potting layer 6 is provided with a baffle cylinder 12 having slits 11 extending in the direction at an angle to the axis of the cylindrical casing 3. In this case, the baffle cylinders 12 can also be molded integrally as portions of the cylindrical casing 3, to be fitted in the diaphragm.

The baffle cylinder 12 is fitted in the potting layer 6, when the hollow-fiber membrane bundle is potted with a polymeric material such as polyurethane, silicone or epoxy. In this example, a portion of the baffle cylinder 12 on the header 8 side is fitted in the diaphragm 6, and the slits in the portion fitted in the diaphragm 6 contain the potting material.

Figure 3:
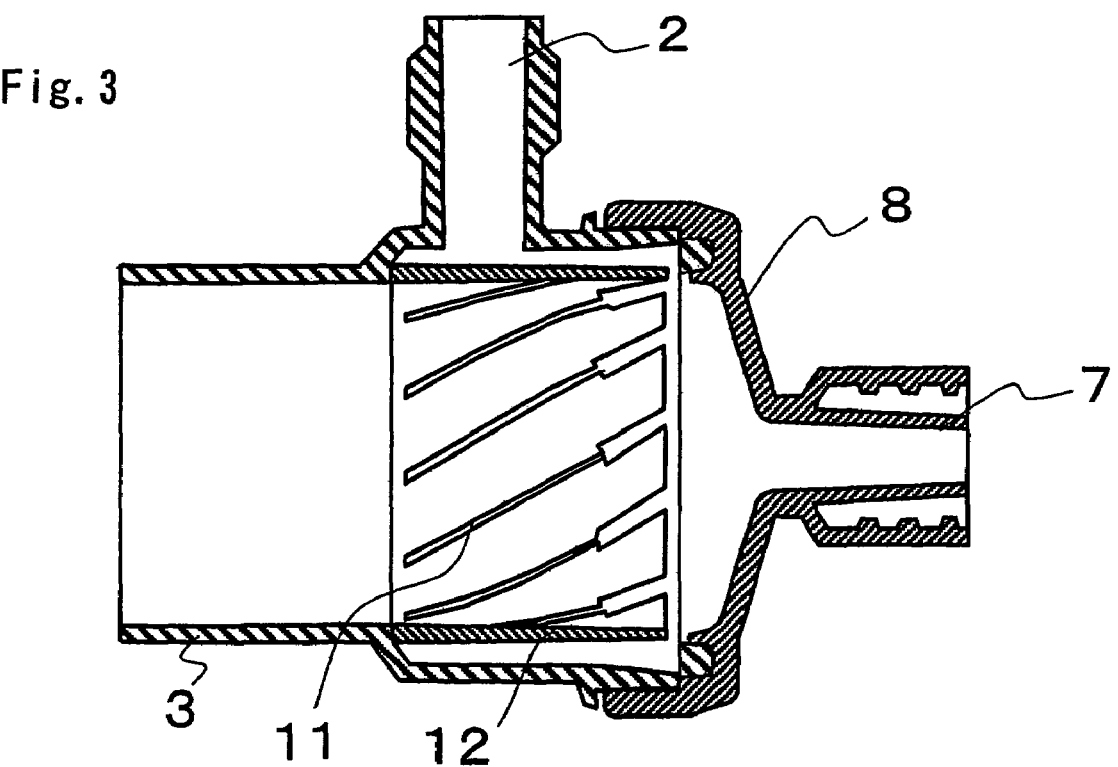
FIG. 3 is a schematic partial longitudinal sectional view showing the end on the treating liquid outlet port side of the hollow-fiber membrane module shown in FIG. 2, devoid of the potting layer and the hollow-fiber membrane bundle.

FIG. 3 shows the end of the cylindrical casing 3 shown in FIG. 2 on the outlet port 2 side, devoid of the potting layer 6 and the hollow-fiber membrane bundle 4, to facilitate the understanding on the constitution of the baffle cylinder 12.

FIGS. 2 and 3 show the end of the cylindrical casing 3 on the treating liquid outlet port 2 side, but the end of the cylindrical casing 3 on the inlet port 1 side is also constituted in quite the same way.

In this hollow-fiber membrane module, blood is dialyzed as described below. The dialyzing fluid as the treating liquid is made to flow in the cylindrical casing 3 from the inlet port 1 toward the outlet port 2, and blood as the liquid undergoing treatment is made to flow in the hollow-fiber membranes from the inlet port 7 of the header 8 toward the outlet port 9 of the header 10, for dialysis of blood.

The baffle cylinder can also be entirely fitted in the potting layer. However, if the baffle cylinder is partially fitted in the potting layers on the header side while it is exposed to the inside of the cylindrical casing in the remaining portion as in the above-mentioned example, the treating liquid flowing in the cylindrical casing can be straightened, if the form, arrangement and others of the slits are designed adequately. It is most preferred that the baffle cylinders are molded integrally with the cylindrical casing for lowering the production cost. However, if the baffle cylinders molded separately from the cylindrical casing can be firmly fixed to the cylindrical casing by means of welding or the like, the same effect can be obtained though the production cost becomes higher.

The form of the slits in the baffle cylinder can be selected as desired, only if the slits extend in the direction at an angle to the axis of the cylindrical casing. As shown in FIGS. 2 and 3, it is most preferred that the slits are wider in the portion fitted in the potting layer than in the other portion, to increase the potting material filling the slits, since the peeling strength can be enhanced. However, the slits can also be formed to have a uniform width. The slits can also form portions of spirals extending from a cylindrical screw shaft used as the cylindrical casing.

The number of slits is not especially limited, but it is most preferred that the number is about 6 to about 12, in view of the moldability and mechanical strength of the cylindrical casing, the straight flow of the treating liquid, etc. In the above-mentioned example, plural slits are arranged in a dispersion in the circumferential direction of the baffle cylinder, but one slit extending like a screw from the cylindrical casing can also be used. In the case where plural slits are arranged, they can be arranged at equal intervals in the circumferential direction of the baffle cylinder, or at desired non-equal intervals. It is only required that the slits extend in the direction at an angle to the axis of the cylindrical casing. However, it is preferred that no slit exists directly below the inlet port 1. This is intended to prevent the treating liquid inflowing from the inlet port 1 from directly colliding with the hollow-fiber membranes, and is well known in hollow-fiber membrane dialyzers.

If the slits are perpendicular to the axis of the cylindrical casing, it is very difficult to mold the baffle cylinders integrally with the cylindrical casing in view of the structure of the mold used for injection molding, and since it is necessary to produce the baffle cylinders separately from the cylindrical casing in this case, the production cost rises. So, these slits are not the slits extending in the direction slanting to the axis of the cylindrical casing as intended in this invention.

Figure 4:
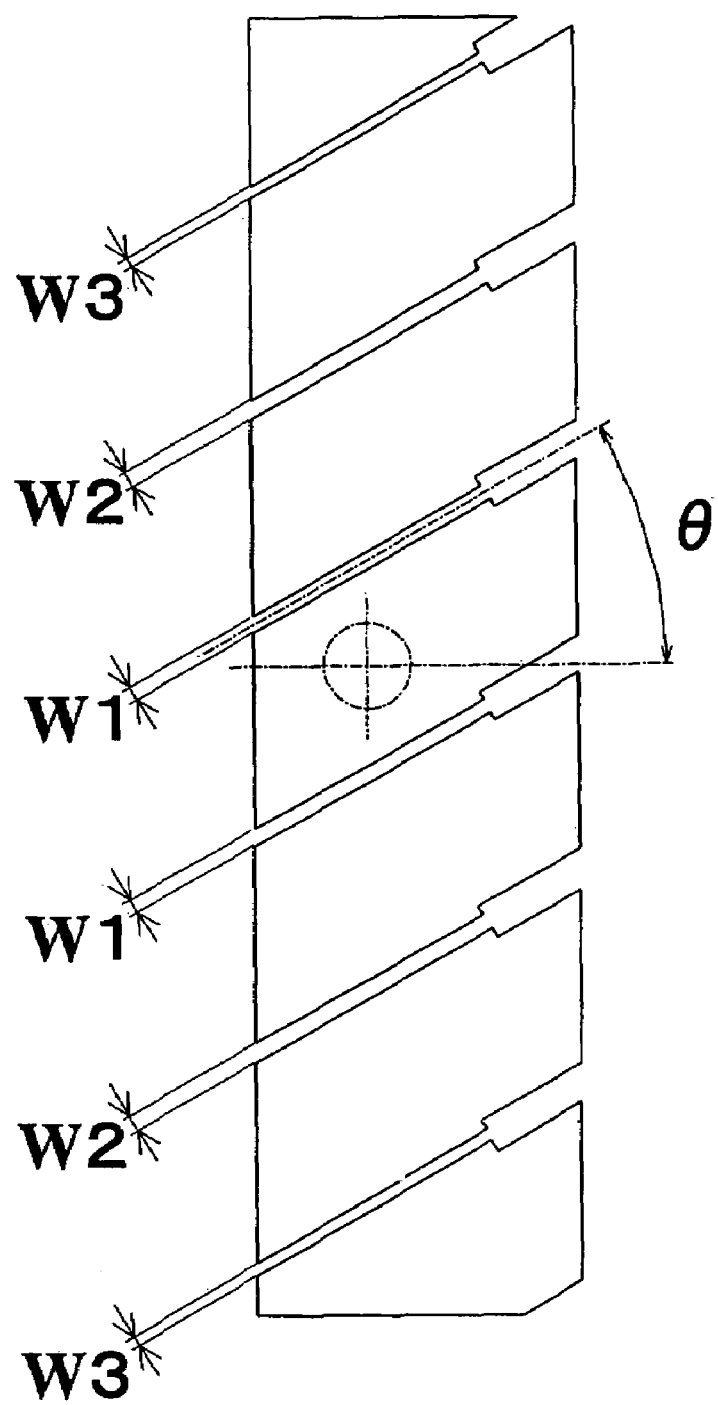
FIG. 4 is a development of the baffle cylinder shown in FIG. 3.

FIG. 4 shows an image in which the baffle cylinder 12 shown in FIG. 3 is developed. In FIG. 4, it is preferred that the slant angle θ of the slits 11 is in a range of about 15° to about 60°, so that the dialyzing fluid as the treating liquid can penetrate into the clearances formed between the hollow-fiber membranes paralleled in the axial direction of the cylindrical casing 3 in the cylindrical casing 3 uniformly in the circumferential direction of the cylindrical casing 3. It is more preferred that θ is in a range of about 30° to about 45°, in view of the moldability and mechanical strength of the cylindrical casing, the straight flow of the treating liquid, etc. Even if the slits extend in the direction slanting to the axis leftward or rightward, there is no significant difference. Furthermore, if the number of hollow-fiber membranes existing behind the baffle cylinders 12, i.e., the number of hollow-fiber membranes not exposed to the slits 11 is kept small, the penetration of the treating liquid into the cylindrical casing 3 can be promoted.

Moreover, for allowing the treating liquid inflowing from the inlet port 7 to flow straight and allowing it to be almost uniformly distributed to the respective hollow-fiber membranes, it is preferred that the widths W of the slits are individually set in a range of about 0.5 mm to about 3 mm based on a computer-aided fluid analysis, etc.

If the baffle cylinders having slits as described above are fitted in the potting layers, when a force for peeling one of the potting layers from the cylindrical casing acts on the potting layer, the force can be dispersed in the circumferential direction, to prevent that the diaphragm peels or comes off from the cylindrical casing. In addition, a treating liquid straightening effect can also be obtained.

In the above-mentioned example, the flow of the treating liquid counters the flow of the liquid undergoing treatment, but both liquids can also flow in the same direction. Particularly, in the hollow-fiber membrane module of FIG. 1, it is possible that the outlet 9 for the liquid undergoing treatment provided in the header 10 at one end of the cylindrical casing 3 is used as the inlet port for the liquid undergoing treatment, while the inlet port 7 for the liquid undergoing treatment provided in the header 8 at the other end is used as the outlet port for the liquid undergoing treatment.

Furthermore, the liquid undergoing treatment can be made to flow outside the hollow-fiber membranes, while the treating liquid can be made to flow inside the hollow-fiber membranes. Particularly in the hollow-fiber membrane module of FIG. 1, it is possible that the liquid undergoing treatment can be made to flow inside the cylindrical casing 3 from the inlet port 1 to the outlet port 2, and the treating liquid can be made to flow inside the hollow-fiber membranes from the inlet port 7 of the header 8 to the outlet port 9 of the header 10.

The hollow-fiber membranes used in the hollow-fiber membrane module of this invention are not especially limited, but hollow-fiber membranes made of acryl, polysulfone, polyether sulfone, cellulose, triacetate, polyethylene, polypropylene or the like can be suitably used.

To produce the hollow-fiber membrane module of this invention, for example as disclosed in JP63-17464B, the cylindrical casing is packed with the hollow-fiber bundle in the axial direction of the casing cylinder, and the hollow-fiber membrane bundle is bonded and sealed with a potting material at their both ends at the openings of the cylindrical casing, to form potting layers. Since the slant slits of the baffle cylinders fitted in the cylindrical casing are not parallel to the axis of the cylindrical casing, it does not happen that the hollow-fiber membranes jump out through the slits when the hollow-fiber membrane bundle is loaded. Thus, the hollow-fiber membrane bundle can be loaded smoothly. Furthermore, still after completion of loading, the hollow-fiber membrane bundle can be supported without any disturbance of the hollow-fiber membrane bundle.

The potting layers formed as described above are cut off at their outer ends using a sharp knife, to open the hollow-fiber membranes at the end faces of the potting layers made of a potting material, for exposing the hollow-fiber membranes on the surfaces of the diaphragms. Then, headers for forming manifolds are bonded to both the ends of the cylindrical casing by means of ultrasonic bonding or the like, to obtain the hollow-fiber membrane module of this invention.

The hollow-fiber membrane module of this invention can be used for dialysis of blood as described above, and can also be used for purifying wastewater, for producing drinking water, for installation in a humidifier of fuel cells, and so on.

As described above, in the case where the hollow-fiber membrane module of this invention is used for dialysis of blood, the liquid undergoing treatment is blood, and the treating liquid is a dialyzing fluid. Furthermore, in the case where the hollow-fiber membrane module of this invention is used for purifying wastewater, for producing drinking water, or for installation in a humidifier of fuel cells, raw dirty water or air can be used instead of the treating liquid, and purified clean water or air can be obtained as the liquid undergoing treatment.

EXAMPLES

Example

To produce a hollow-fiber membrane module for dialysis of blood shown in FIG. 1, the inventors used a random copolymer-based polypropylene produced by Chisso Corp. (trade name: Chisso Polypro XK4644) as the material of the cylindrical casing, and the polysulfone disclosed in the examples of JP2001-170172A as the material of the hollow-fiber membrane bundle. The number of hollow-fiber membranes was 9400. As the potting material, urethane resin (trade name: KC399/N4223) produced by Nippon Polyurethane Industry Co., Ltd. was used. The potting layers were formed at a centrifugal force of about 80 G, and both the ends of the hollow-fiber membrane bundle were fixed to the inner wall of the cylindrical casing. As for the slant slits formed in the baffle cylinders, as shown in FIG. 4, the number of slits was n=6, and the angle was θ=30°, the widths of the slits being W1=1.3 mm, W2=1.6 mm and W3=0.9 mm. These values were decided based on the results of analysis made using fluid analysis software produced by CD-adapco Japan Co., Ltd. The slits were spirally formed, and arranged at equal intervals in the circumferential direction of the baffle cylinders, extending in the direction slanting rightward. The baffle cylinders were integrally molded as portions of the cylindrical casing. That is, the material of the baffle cylinders was the same as that of the cylindrical casing. The diaphragms formed like this were cut off using a sharp knife, to open the hollow-fiber membranes at the end faces of the potting material, for exposing them on the surfaces of the potting layers. In this case, the potting layers did not come off, and smooth and clean end faces could be obtained. Then, headers for forming manifolds were bonded to both the ends of the cylindrical casing by means of ultrasonic bonding, to obtain a hollow-fiber membrane module of this invention.

Comparative Example 1

Like the hollow-fiber membrane module of the above-mentioned example, polypropylene was used as the material of the cylindrical casing, to produce a hollow-fiber membrane module as described for the example. However, the slits formed in the baffle cylinders were parallel to the axis of the cylindrical casing with θ=0°. The number of slits was n=6, and the widths of the slits were W1=1.3 mm, W2=1.6 mm and W3=0.9 mm. The slits were arranged at equal intervals in the circumferential direction of the baffle cylinders. So, the slits were made as similar to those of the example as possible. The module was potted as described for the example, to form potting layers, and the formed potting layers were cut off using a sharp knife. The potting layers were drawn from the cylindrical casing, to damage the hollow-fiber membrane bundle.

Comparative Example 2

A hollow-fiber membrane module with almost the same form as that of the above-mentioned example was produced as described for the example, except that the material of the cylindrical casing was polystyrene, and that baffle plates were installed directly below the ports only as known since before and as disclosed, for example, in JP57-22762A. The performance of this hollow-fiber membrane module was compared with that of the example, and the results were as shown in Table 1. It was confirmed that the hollow-fiber membrane module of the example was more excellent in performance.

TABLE 1

| Performance evaluation item | Example | Comparative Example 2 |
| --- | --- | --- |
| Urea clearance (ml/min) | 190 | 1188 |
| Phosphorus clearance (ml/min) | 130 | 125 |
| β2-MG clearance (ml/min) | 60 | 58 |

The clearances of the above-mentioned solutes were measured according to the Dialyzer Performance Evaluation Standard (Japanese Society for Artificial Organs, September 1982). The standard includes two measuring methods, and in this experiment, the measurement was carried out based on TMP 0 mmHg. Each clearance was calculated using the following equation.

Clearance

[Numerical Formula 1]

$$C_L \text{ (ml/min)} = \frac{CBi - CB0}{Cbi} \cdot Q_B$$

where CBi: Concentration on the inlet side of module, CBo: Concentration on the outlet side of module, QB: Amount of liquid supplied to module (ml/min).

INDUSTRIAL APPLICABILITY

In the hollow-fiber membrane module of this invention, baffle cylinders having slits extending in the direction at an angle to the axis of a cylindrical casing are fitted in diaphragms used for fixing a hollow-fiber membrane bundle to the inner wall of the cylindrical casing at both the ends of the hollow-fiber membrane bundle. Therefore, when the hollow-fiber membrane module is produced by inserting the hollow-fiber membrane bundle slightly longer than the length of the cylindrical casing, into the cylindrical casing, potting the hollow-fiber membrane bundle at its both ends with a polymeric material to form the potting layers, and cutting off the potting ends using a sharp knife, to open the hollow-fiber membranes in the potting end faces, the force acting on the potting layers for peeling them from the cylindrical casing can be dispersed in the circumferential direction, to prevent that the potting layers peel or come off from the cylindrical casing.

The hollow-fiber membrane module of this invention can be used, therefore, for dialysis of blood as described above, and can also be used for a variety of applications such as purifying wastewater, producing drinking water or installing in a humidifier of fuel cells.

What is claimed is:

1. A hollow-fiber membrane module comprising:
    a cylindrical casing having an inner wall,
    a hollow-fiber membrane bundle contained in the cylindrical casing,
    potting layers for fixing the hollow-fiber membrane bundle to the inner wall at both end portions of the hollow-fiber membrane bundle, and
    a baffle cylinder associated with an end portion of the cylindrical casing and having an internal surface with slits extending in a direction at an angle toward, but not to a central axis extending along the cylindrical casing and fitted in the potting layers.

2. A hollow-fiber membrane module comprising:
    a cylindrical casing having an inner wall,
    an inlet port for liquid undergoing treatment or treating liquid at one end portion of the cylindrical casing and an outlet port for liquid undergoing treatment or treating liquid at another end portion of the cylindrical casing,
    a hollow-fiber membrane bundle contained in the cylindrical casing,
    potting layers for fixing the hollow-fiber membrane bundle to the inner wall at both end portions of the hollow-fiber membrane bundle,
    a header having an outlet port for the liquid undergoing treatment or the treating liquid provided at one of the end portions of the cylinder casing,
    a header having an inlet port for the liquid undergoing treatment or the treating liquid provided at the other end portion of the cylinder casing, such that when the treating liquid flows through the inlet and outlet ports of the cylindrical casing, the liquid undergoing treatment flows through the header inlet and outlet ports and, when the liquid undergoing treatment flows through the inlet and outlet ports of the cylindrical casing, the treating liquid flows through the header inlet and outlet ports, and
    a baffle cylinder associated with an end portion of the cylindrical casing and having an internal surface with slits extending in a direction at an angle toward, but not to a central axis extending along the cylindrical casing and fitted in the potting layers.

3. The hollow-fiber membrane module according to claims 1 or 2, wherein the slits form portions of spirals extending from a cylindrical screw shaft used as the cylindrical casing.

4. The hollow-fiber membrane module, according to claims 1 or 2, wherein plural slits are arranged in the circumferential direction of the baffle cylinder.

5. The hollow-fiber membrane module according to claim 4, wherein plural slits are arranged at substantially equal intervals in the circumferential direction of the baffle cylinder.

6. The hollow-fiber membrane module according to claims 1 or 2, wherein the module is for dialysis of blood.

7. The hollow-fiber membrane module according to claims 1 or 2, wherein the slits slant at an angle θ range of about 15° to about 60°, and the number of the slits is about 6 to about 12, the widths W of the respective slits being individually set in a range of about 0.5 mm to about 3 mm.

8. The hollow-fiber membrane module according to claim 2, wherein the liquid undergoing treatment is blood.

* * * * *